United States Patent [19]

Stottmann

[11] Patent Number: 4,893,942

[45] Date of Patent: Jan. 16, 1990

[54] MEMBRANE POTENTIOMETER SPEED SELECTION CONTROL FOR AN ELECTRIC FOOD MIXER

[75] Inventor: Richard L. Stottmann, Louisville, Ky.

[73] Assignee: Whirlpool Corporation, Benton Harbor, Mich.

[21] Appl. No.: 137,459

[22] Filed: Dec. 23, 1987

[51] Int. Cl.⁴ .................. B01F 7/18; H02P 5/06; H02P 7/18

[52] U.S. Cl. .................. 366/279; 366/601; 388/827; 388/936

[58] Field of Search ............... 366/601, 344, 129, 279; 338/114, 196, 68, 99, 119, 199; 200/159 B, 308, 302.1, 302.2; 318/305, 349, 358; 340/52 R, 815.01; 388/840, 855, 936, 807, 827

[56] References Cited

U.S. PATENT DOCUMENTS

| | | | |
|---|---|---|---|
| 2,987,636 | 6/1961 | Jepson | 366/129 X |
| 3,833,845 | 9/1974 | Smallbone et al. | 318/305 |
| 3,908,100 | 9/1975 | Richard et al. | 318/305 X |
| 3,968,467 | 7/1976 | Lampen et al. | 338/196 X |
| 4,127,752 | 11/1978 | Lowthorp | 200/308 X |
| 4,410,846 | 10/1983 | Gerber et al. | 318/305 X |
| 4,430,605 | 2/1984 | Arnold | 318/305 X |
| 4,513,381 | 4/1985 | Houser, Jr. et al. | 318/305 X |
| 4,568,193 | 2/1986 | Contri et al. | 318/325 X |
| 4,631,513 | 12/1986 | Teshima et al. | 340/52 R |

*Primary Examiner*—Philip R. Coe
*Assistant Examiner*—Scott J. Haugland
*Attorney, Agent, or Firm*—Mason, Kolehmainen, Rathburn & Wyss

[57] ABSTRACT

An electric food mixer includes a membrane potentiometer control which is responsive to a user's touch to select the speed of the mixer's motor. The top surface of the membrane potentiometer control is flexible and forms a continuous strip which is mounted flush with the mixer motor's housing so as to facilitate cleaning and improve the appearance of the mixer. The top surface of the membrane potentiometer control may include a flexible liquid crystal display to provide to the user visual feedback of the selected motor speed. A digital control is responsive to the output of the membrane potentiometer control for operating the mixer's motor at a mixer motor speed selected in accordance with the membrane potentiometer's output from a large number of selectable mixer motor speeds stored in a look up table in the digital control.

19 Claims, 1 Drawing Sheet

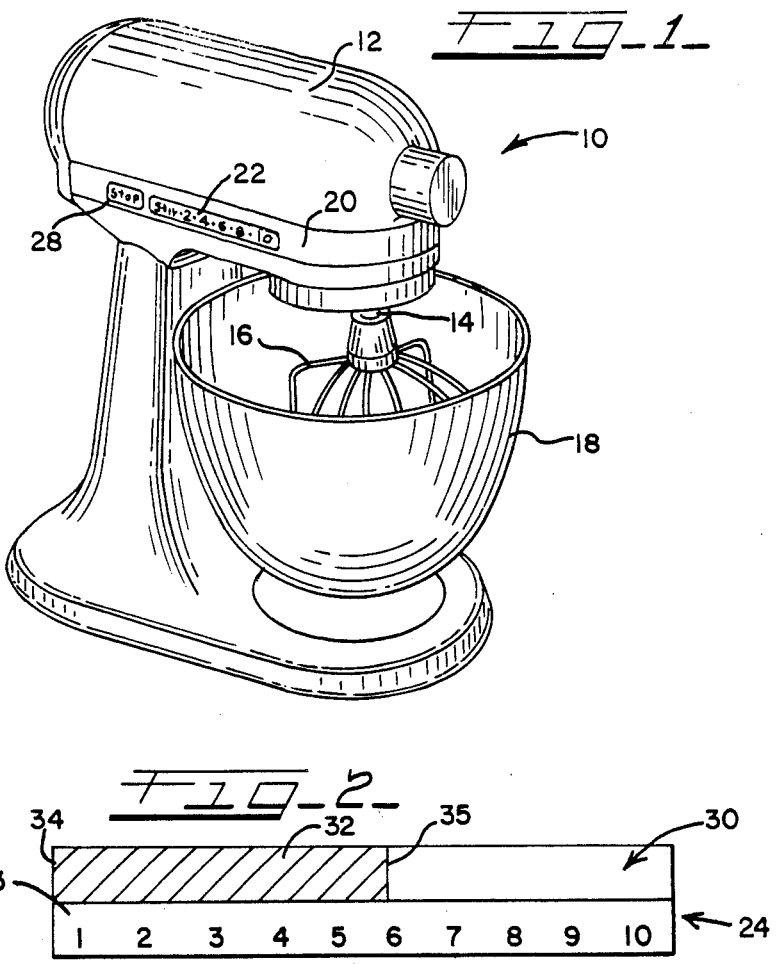
FIG-1
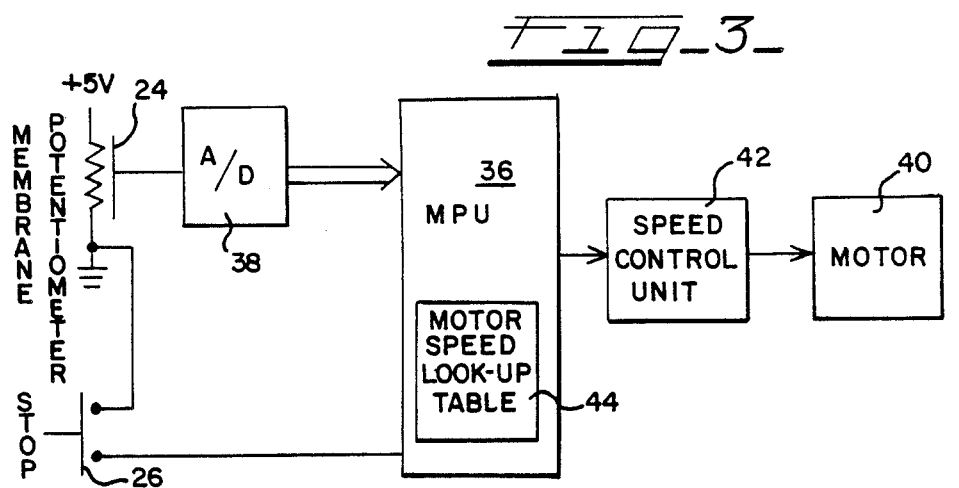
FIG-2
FIG-3

MEMBRANE POTENTIOMETER SPEED SELECTION CONTROL FOR AN ELECTRIC FOOD MIXER

FIELD OF THE INVENTION

The present invention relates to an electric food mixer and, more particularly, to an electric food mixer having a touch sensitive membrane potentiometer control actuable by a user to select the speed of the mixer's motor.

DESCRIPTION OF THE PRIOR ART

Known electric food mixers typically include a speed selection switch which is manually movable by a user into one of a number of speed selection settings, each setting representing a selectable running speed for the mixer's motor. The number of available speed selection settings and thus selectable motor running speeds, is typically very limited such as on the order of ten. Further, such speed selection switches are often movable from setting to setting in a slot or opening in the mixer housing. Such openings can collect food from the mixer causing damage thereto. These switch openings are also difficult to clean.

SUMMARY OF THE INVENTION

In accordance with the present invention, the disadvantages of prior art food mixers have been overcome. The electric food mixer of the present invention includes a touch sensitive membrane potentiometer control actuable by a user to select the speed of the mixer's motor.

The membrane potentiometer control of the present invention is responsive to a user's touch at a location along the membrane for providing a signal representing a user selected mixer motor speed wherein a different motor speed selection signal is provided for each different location on the membrane potentiometer control actuable by a user's touch. The membrane potentiometer control is coupled to a motor speed controller which includes a memory for storing data representing a plurality of motor running speeds wherein the data representing each motor running speed is associated with at least one speed selection signal. In response to a speed selection signal from the membrane potentiometer control, the motor speed controller controls the mixer's motor to run at the motor speed represented by the stored data associated with the speed selection signal. The motor speed controller is digital so that although the membrane potentiometer control provides an infinite number of speed selections, the motor speed controller controls the mixer motor to run at a finite number of speeds. This finite number of motor running speeds is however much greater than the limited number typically provided by prior speed selection switches, the number of selectable motor running speeds of the present invention preferably being on the order of 64.

The membrane potentiometer control includes a flexible elongated band forming a continuous strip which is mounted flush with the mixer housing so that no openings are present which can collect food. The membrane potentiometer thus protects the electronics mounted in the mixer housing; it facilitates cleaning of the mixer; and it further has a sleeker design so as to be more visually appealing than prior speed selection switches for electric food mixers.

In the preferred embodiment, the membrane potentiometer control also includes means for providing a visual indication of the motor speed selected by a user. Such a visual indication may be provided by a flexible liquid crystal display or the like forming the top surface of the membrane potentiometer control.

These and other objects, advantages and novel features of the present invention, as well as details of an illustrated embodiment thereof, will be more fully understood from the following description and the drawing.

BRIEF DESCRIPTION OF THE DRAWING

FIG. 1 is a perspective view of an electric food mixer constructed in accordance with the principles of the present invention;

FIG. 2 illustrates the uppermost surface of a membrane potentiometer control having a flexible visual display; and FIG. 3 is a block diagram of the electronic control of the food mixer of the present invention.

DESCRIPTION OF THE PREFERRED EMBODIMENT

An electric food mixer 10, as shown in FIG. 1, constructed in accordance with the principles of the present invention includes a motor disposed within a motor head housing 12 and an electronic control for controlling the operation of the motor and mixer 10 as shown in more detail in FIG. 3. The motor is coupled to at least one beater shaft 14 that is, in turn, coupled to at least one beater 16 to impart rotation to the shaft 14 and the beater 16. Although only one beater 16 is shown, the mixer 10 can obviously be designed to operate with more than one beater. In a preferred embodiment of the mixer 10, the beater 16 is moved around a stationary mixing bowl 18, while, at the same time, rotating in the opposite direction about its own axis to provide planetary mixing action. Alternatively, the mixer 10 can be designed to rotate the mixing bowl 18 on a rotatable support base and, if desired, to maintain the axis of rotation of the beater 16 stationary.

Mounted flush with the motor head housing 12 and extending about the sides thereof is a flexible trim band 20. The trim band 20 may be made of a plastic such as Mylar or other material which is flexible enough to actuate, in response to a user's touch, a membrane potentiometer 24 and stop switch 26 shown schematically in FIG. 3 and mounted under respective portions 22 and 28 of the trim band 20. The portion 28 of the trim band 20 includes a marking labeled "STOP" to identify the location of the stop switch 26 mounted thereunder; whereas the portion 22 of the trim band 20 includes markings labeled "STIR, 2, 4, 6, 8, 10" to identify a few of the motor speeds selectable by actuation of the membrane potentiometer 24 as discussed in detail below.

The membrane potentiometer 24 is responsive to a user's touch at a location along the portion 22 of the trim band 20 to provide a signal representing the touched location and thus representing a selected mixer motor speed. Although the membrane potentiometer 24 is capable of providing an infinite number of motor speed selection signals within the range of the potentiometer 24, the electronic motor control responsive to the output of the membrane potentiometer 24, as shown in FIG. 3, is digital and thus capable of providing only a finite number of selectable motor running speeds as discussed below. The membrane potentiometer 24 may be a Spectra Symbol SOFTPOT. Preferably, however, the membrane potentiometer 24 includes a flexible liquid crystal display 30, as shown in FIG. 2, to provide visual feedback to the user of the mixer motor speed selected by the user's touch. The flexible liquid crystal display 30 forms the top surface of the membrane potentiometer 24, the membrane potentiometer 24 being mounted on the motor head housing 12 of the mixer 10 such that the flexible liquid crystal display 30 is flush with the housing 12. The membrane potentiometer 24 with flexible liquid crystal display 30 responds to a user's touch along a top surface 33 thereof to provide a motor speed selection signal as discussed above and to provide a color bar 32 extending from an end 34 of the liquid crystal display 30, the end 34 representing the lowest selectable motor speed, to the location 35 of the top surface 33 touched by the user.

As shown in FIG. 3, the output of the membrane potentiometer 24 is coupled to a microprocessor 36 through an analog-to-digital converter 38; whereas, the stop switch 26 is coupled directly to the microprocessor 36. The membrane potentiometer 24 is connected between +5 volts and ground to provide a voltage to the analog-to-digital converter 38 that represents the location along the portion 22 of the trim band 20 shown in FIG. 1 or the location along the top surface 33 of the membrane potentiometer 24 shown in FIG. 2, touched by a user. The voltage output of the membrane potentiometer 24 also represents the mixer motor speed selected by the user. The analog-to-digital converter 38 in turn provides a digital representation of the speed selection voltage from the membrane potentiometer 24. The microprocessor 36 is responsive to the digital speed selection signal from the analog-to-digital converter 38 to control the speed of the mixer motor 40 in accordance therewith through a conventional motor speed control unit 42 that provides an interface between the microprocessor 36 and the motor 40.

The microprocessor 36 includes a memory with a look up table 44 for storing data representing the mixer motor speeds at which the microprocessor 36 and control unit 42 control the motor 40 to operate. For example, the look up table 44 may store 32 mixer motor speeds, although in the preferred embodiment the table 44 stores at least 64 mixer motor speeds. Each stored mixer motor speed is associated with at least one speed selection signal from the membrane potentiometer 24. More specifically, since the membrane potentiometer 24 is capable of providing an infinite number of speed selection signals within the range of the potentiometer 24 and the look up table 44 is capable of storing a finite amount of data, the data representing each mixer motor speed stored in the look up table 44 is associated with a range of motor speed selection signals from the membrane potentiometer 24. By storing data representing a large number of motor speeds, the membrane potentiometer's capability of providing an infinite number of speed selections is more fully taken advantage of.

In order to operate the mixer 10, a user touches the portion 22 of the trim band 20 shown in FIG. 1 or the top surface 33 of the membrane potentiometer 24 shown in FIG. 2 at a location representing the desired mixer motor speed. The membrane potentiometer control 24 disposed beneath the trim band 20 or top surface 33 is responsive to the user's touch transmitted through the trim band 20 or top surface 33 to provide a motor speed selection signal representing the location along the membrane potentiometer control 24 actuated by the user's touch. Upon receipt of a motor speed selection signal, the microprocessor 36 controls the mixer motor 40 to operate at the motor speed represented by the data stored in the look up table 44 associated with that motor speed selection signal. In response to each new motor speed selection signal, the microprocessor 36 varies the motor speed in accordance therewith.

The electric food mixer 10 of the present invention with the membrane potentiometer control 24 is capable of providing a large number of motor speed selections limited only by the resolution of the analog-to-digital converter 38 and the storage capabilities of the microprocessor 36. Further, because the trim band 20 shown in FIG. 1 and the top surface 33 of the membrane potentiometer control 24 shown in FIG. 2 each form a continuous strip mounted flush with the motor head housing 12, there are no openings in the housing 12 that can collect food. The electronics mounted within the housing 12 are thus protected; cleaning of the mixer is facilitated; and the mixer 10 has a more attractive appearance than prior food mixers.

Many modifications and variations of the present invention are possible in light of the above teachings. Thus, it is to be understood that, within the scope of the appended claims, the invention may be practiced otherwise than as specifically described hereinabove.

What is claimed and is desired to be secured by Letters Patent is:

1. An electric food mixer comprising:
    at least one beater;
    a motor for rotating said beater;
    elongated membrane speed selection means having a plurality of contiguous locations along the length of said means representing a plurality of selectable running speeds of said motor and responsive to a user's touch at one of said locations for providing a signal representing a selected motor speed; and
    means responsive to said selected motor speed signal for controlling the speed of said motor.

2. An electric food mixer as recited in claim 1 wherein said membrane speed selection means includes a flexible upper surface forming a continuous strip to prevent the collection of food.

3. An electric food mixer as recited in claim 2 further including a housing for said motor, said membrane speed selection means being mounted on said mixer with said flexible upper surface flush with said housing.

4. An electric food mixer as recited in claim 1 wherein said membrane speed selection means includes means for providing a visual indication of a selected motor speed.

5. An electric food mixer as recited in claim 1 wherein said membrane speed selection means includes a flexible liquid crystal display.

6. An electric food mixer comprising:
    at least one beater;
    a motor for rotating said beater;
    touch sensitive potentiometer means responsive to a user's touch at one of a plurality of locations on said means for providing a signal representing a user selected speed, a different speed selection signal being provided for each different location on said potentiometer means actuable by a user's touch; and means responsive to said touch sensitive potentiometer means for controlling the speed of said motor in accordance with said speed selection signal.

7. An electric food mixer as recited in claim 6 wherein said control means includes:
   means for storing data representing a plurality of motor speeds, the data representing each motor speed being associated with at least one of said speed selection signals; and
   means responsive to one of said speed selection signals for controlling said motor to run at the motor speed represented by the data associated with said speed selection signal.

8. An electric food mixer as recited in claim 7 wherein said storing means stores data representing at least 32 motor speeds.

9. An electric food mixer as recited in claim 7 wherein said storing means stores data representing at least 64 motor speeds.

10. An electric food mixer as recited in claim 6 wherein said touch sensitive potentiometer means includes means for providing a visual indication of a selected motor speed in response to a user's touch at a location on said potentiometer means.

11. An electric food mixer as recited in claim 10 wherein said visual indication means includes a flexible liquid crystal display.

12. An electric food mixer comprising:
   at least one beater;
   a motor for rotating said beater;
   membrane speed selection means having a flexible, elongated band and responsive to a user's touch at one of a plurality of user actuable locations along the length of said band for providing a signal representing said touched location; and
   means responsive to said touched location signal for controlling the speed of said motor.

13. An electric food mixer as recited in claim 12 wherein said control means includes:
   means for storing data representing a plurality of motor speeds, the data representing each motor speed being associated with at least one of said user actuable locations; and
   means responsive to said touch location signal for controlling said motor to run at the motor speed associated with the user actuable location represented by said touched location signal.

14. An electric food mixer as recited in claim 13 wherein said storing means stores data representing at least 32 motor speeds.

15. An electric food mixer as recited in claim 13 wherein said storing means stores data representing at least 64 motor speeds.

16. An electric food mixer as recited in claim 13 wherein said band forms a continuous strip to prevent the collection of food.

17. An electric food mixer as recited in claim 16 further including a housing for said motor, said band being mounted on said mixer flush with said housing.

18. An electric food mixer as recited in claim 12 wherein said band includes means for providing a visual indication of a selected motor speed.

19. An electric food mixer as recited in claim 12 wherein said membrane speed selection means includes a flexible liquid crystal display.

* * * * *